INVENTORS
GORDON BEALE DUNNINGTON
REUBEN THOMAS FIELDS

BY *Frank C. Hilberg Jr.*

ATTORNEY

Nov. 21, 1967  G. B. DUNNINGTON ET AL  3,354,023
ORIENTED POLYMERS

Filed April 22, 1963  7 Sheets-Sheet 7

INVENTORS
GORDON BEALE DUNNINGTON
REUBEN THOMAS FIELDS

BY *Frank C. Hilberg Jr.*

ATTORNEY

United States Patent Office 3,354,023
Patented Nov. 21, 1967

3,354,023
ORIENTED POLYMERS
Gordon Beale Dunnington, Wilmington, and Reuben Thomas Fields, Brandywine Hills, Del., assignors to E. I. du Pont de Nemours and Company, Wilmington, Del., a corporation of Delaware
Filed Apr. 22, 1963, Ser. No. 275,480
19 Claims. (Cl. 161—165)

This invention relates to highly oriented plastic shapes such as strapping and the process of making such shapes.

This application is a continuation-in-part of application Ser. No. 195,468, filed May 17, 1962, and now abandoned, by Gordon B. Dunnington and Reuben T. Fields.

The conventional strapping used to bind large containers is currently made from steel. Another type of strapping which is widely used where the very high strengths of steel are unnecessary is a strap formed of a series of parallel rayon cords held together by means of a binder. This latter type of strapping is described in U.S. Patent No. 3,028,281, issued Apr. 3, 1962, to Thomas J. Karass.

Steel strapping has high strength but suffers from the disadvantages of often having sharp edges which present a safety hazard, it does not burn and presents a disposal problem after use, and it cannot be stretched when wrapped about a container so that it will shrink or relax as the container shrinks, as typically happens with wood crates or containers so as to maintain the container in its original tightly bound condition. Strapping made from parallel rayon cords suffers from the disadvantages of too low a tensile break strength for use on large crates and a very low transverse strength such that the cords will pull apart if not uniformly fastened when placed in use.

This invention has as an object the manufacture of a strap which has a strength high enough to act as a substitute for steel strapping but which can be readily disposed of after use by burning, which will not have sharp edges, which can be stretched when wrapped about a package and which will shrink about the package so as to retain tension as the package shrinks. A further object is to produce a strapping which has sufficiently high transverse strength so that it will not readily pull apart if not uniformly fastened. Another object is to produce high strength plastic shapes of various configurations.

These objects are accomplished by the following invention in which a crystallizable synthetic polymer is extruded into a billet which is then rolled so as to produce a uniplanar, axial oriented crystalline product. The oriented polymer must be crystalline in order to have the desired mechanical properties and to retain these properties following exposure to moderately elevated temperatures. It is preferred to orient the crystals so that the polymer chains lie within a narrow angle from the direction of rolling in order to obtain the properties most useful as strapping. However, the maximum obtainable deformation may result in undesirable properties such as a tendency to split, fibrillate, or form a hairy surface. Thus it is necessary to produce a high but carefully controlled degree of deformation. The width of the strapping is preferably from 0.7 to 1.5 times the width of the billet from which it is rolled. To accomplish this objective it has been found that the uniformity of the extruded billet prior to the roll orienting step is of extreme importance to the successful production of a high strength rolled shape. This uniformity relates both to the cross-sectional dimensions of the extruded billet and to any orientation imposed on the billet. If the billet is passed through turns before it has set or cooled sufficiently to have become solid throughout, or at least have thick skins on both surfaces, the still fluid material in the interior will become displaced producing a washboard effect or differential strains. Such an irregular billet cannot be roll oriented into a useful high strength strapping because some sections will pass their maximum orientation potential and fibrillate or become hairy before the central sections have been oriented to their optimum. Roll-oriented polymer tapes and ribbons have been made before but such prior art tapes and ribbons have not had sufficient strength to compete with steel strapping because it had not been possible to impart sufficient orientation to the tapes and ribbons for them to have the requisite strength. Such prior art tapes and ribbons are described in U.S. Patent No. 2,244,208, issued June 3, 1941, to John B. Miles. The strapping of this invention is preferably from 10 to 50 mils thick and from ¼ to ¾ of an inch wide although wider widths can be made and are desirable for some purposes such as helically wrapping large diameter pipe, and widths as narrow as ⅛ inch are useful. The billet is therefore preferably 40 mils thick and at least ¼" wide.

Figure 1:
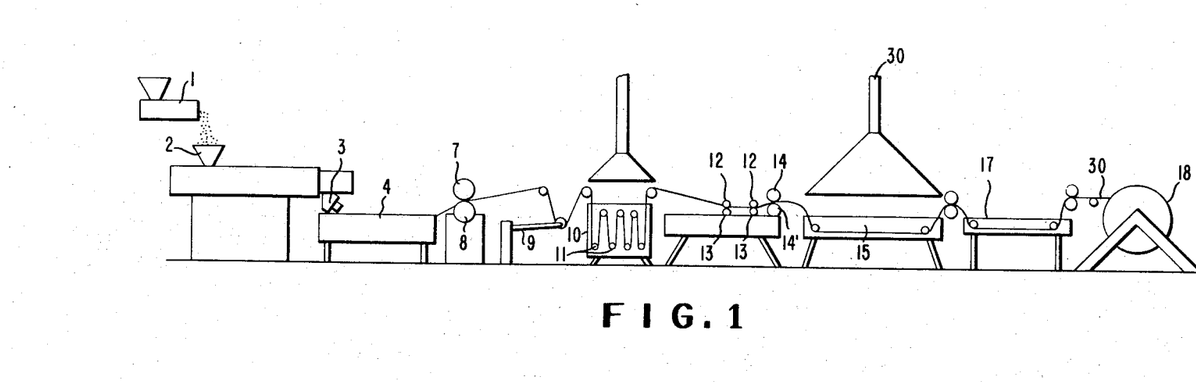
FIGURE 1 is a schematic side view of the entire apparatus.

In carrying out the process of this invention polymer powder or flake is fed by means of flake metering feeder 1 into the extruder hopper 2, and is extruded through extruder head 3 into a quench bath 4. The billet, thus formed, is drawn out of the quench bath by rolls 7 and 8, and is fed across dancer arm 9, into preheater 10, wherein it is passed back and forth across rollers 11.

The temperature of the billet is from ambient temperature to 15° C. below the crystalline melting point of the particular polymer being roll-oriented. Although the billet can be roll oriented at room temperature the operation is performed more smoothly and with a substantial reduction in power consumption when an elevated temperature is used. It should be further noted that even though water is preferably used in the quench bath because of its ready availability and high specific heat, the billet is preferably in an anhydrous condition as it is fed into the orienting rolls. This is because the heat developed in the orientation rolls by the rearrangement of the polymer molecules in the billet may cause vaporization of any water or other low boiling liquid present, and thereby, create voids or other flaws in the strapping. The preheated billet is then fed through one or more pairs of orienting rolls 12 and 13 and is drawn under tension out of the orienting rolls by means of tension rolls 14, 14', passed through heat conditioner 15, equipped with exhaust 31, through wash tank 17 and finally is taken up onto spool 18.

Figure 2:
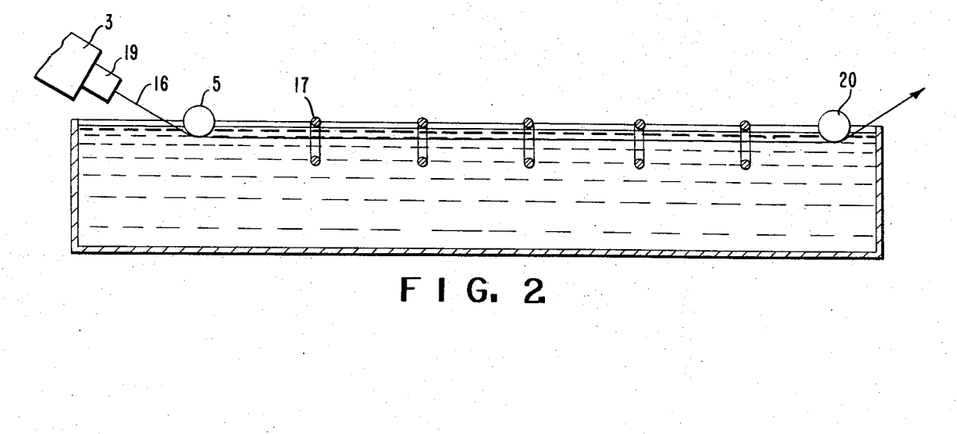
FIGURE 2 is a detailed side view of the extruder head and quench bath.

In FIGURE 2 the billet 16 is shown as it comes from the extrusion head and is passed under guide roll 5, through guide pins 17, and under roll 20 and out of the quench bath. It is preferred that the angle between the extrudate leaving the extruder head 3 and the path the billet follows through the quench bath be small. The preferred angles are from 8 to 15°. Because of the problems involved in removing the billet from the quench bath due to said billets high stiffness it is also preferred to have a small angle of arc as the billet passes under roll 20 prior to leaving the quench bath. Therefore the billet must run substantially parallel to the surface of the quench bath and leave the bath at an angle with the bath surface which also preferably falls within the range of from 8 to 15 degrees. It is also preferred to have the extrusion head as close to the quench bath as possible. When using a low melt strength polymer such as the polyamide of Example I, the distance between the opening 21 and die 19 and the quench bath must be less than 2 inches and preferably less than 1 inch. The path of the billet 16 is preferably parallel to and from ½ to 2 inches below the surface of the liquid in the quench bath. Guide pins 17 are necessary to keep the billet from "snaking" or forming loop-like irregularities. The billet should be guided both vertically and laterally.

Figure 3:
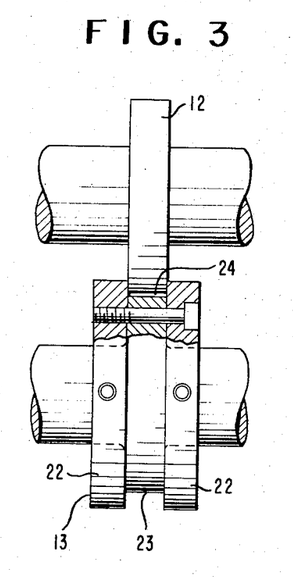
FIGURE 3 is a detailed end view of the orienting rollers.
Figure 4:
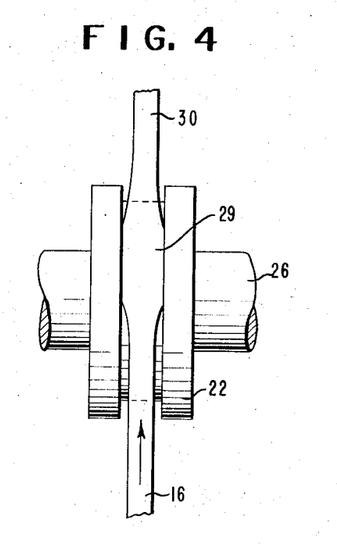
FIGURE 4 is a view of the strapping as it passes through one of the grooved orientation rolls.
Figure 5:
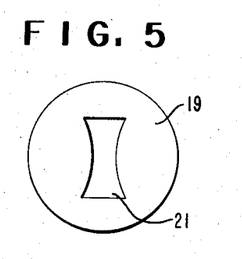
FIGURE 5 is an end view of the extrusion die showing the shape of the die opening.

FIGURE 3 shows the construction of the orienting rolls. It is to be understood that while two pairs of orienting rolls are shown in FIGURE 1, any desired number of rolls may be used. As can be seen from FIGURE 3 each pair of rolls is of tongue and groove construction with one roll having flanges 22 bolted to the central portion 23. This grooved roll can also be formed of integral construction. The function of the flanges 22 is to assist in controlling the width of the oriented strapping by controlling the size of opening 24. These rolls are driven by means of shafts formed integral therewith. The way in which the flanges 22 assist in controlling the width of the strapping is shown in FIGURE 4. The billet 16 enters the nip of the rolls 13 (and 12 not shown for clarity) and expands in width up to the limits of the flanges as at 29, preferably as to barely miss or lightly contact the flanges, the oriented strapping 30 then passes on either to another pair of orienting rolls or to tensioning rolls 14. The amount of tension on strapping 22 imposed by tension rolls 14, 14' controls the amount of decrease in width the strapping undergoes after leaving orienting rolls 12 and 13. The amount of tension imparted by rolls 14, 14' varies with the particular polymer being oriented. In general the tension is only enough to cause the billet to feed uniformly and without any substantial slippage at the nip of the orienting rolls. With polyolefins such as polypropylene or linear polyethylene, it is often preferred to provide some stretching of the strapping as it leaves the orienting rolls. This stretching with polyolefins is preferably about 2×. The strappings of this invention are distinguished from films in that they are over 10 mils thick. The amount of stretch or necking down of the strapping on leaving the orienting rolls must be accurately controlled since the width of the final strapping is preferably within ±0.005 inch of the width being sought or the strapping cannot readily be fastened with commercially available fasteners. These fasteners generally are heavy gage metal seals or clips which fit around the strapping joint and are crimped with a machine similar to that commercially used to join steel strapping, such as those illustrated in U.S. Patent 3,028,281 except preferably with straight sides or edges. Clips or seals require width tolerances. In order to obtain a uniform rectangular billet it is necessary to have the corners of the extrusion die somewhat oversize as is illustrated in FIGURE 5. By using a die of this shape the tendency of the extrudate towards becoming round is overcome and a billet of truly rectangular cross-section can be obtained. If a rectangularly shaped die opening is used the billet will have a nearly oval cross-section and excessive cross orientation will be imposed by the orienting rolls thereby lowering the amount of length deformation which can be imposed on the strapping which in turn lowers its ultimate strength and usefulness.

As has been pointed out above the polymers suitable for use in this invention are crystalline. Polyethylene terephthalate is amorphous as extruded but can be converted to a crystalline form which will yield straps or tapes of sufficient strength. Rolling or heating above the glass temperature of 80° C. will convert amorphous polyethylene terephthalate to the crystalline form. Amorphous polymers such as polymethyl methacrylate cannot be oriented to an extent sufficient to give the high tensile strengths necessary in strapping.

Crystalline polymers are those polymers which show crystallographic reflections when examined with X-rays. Polyethylene terephthalate quenched from the melt is amorphous below 80° C. at which point it crystallizes. Suitable crystalline polymers include polyamides, polyolefins, polyesters, and polyacetal resins. Of these polycaprolactam, polyhexamethylene adipamide, polyhexamethylene sebacamide, polypropylene, polyethylene terephthalate, and polyoxymethylene are preferred. Polyamides containing from 0.2 to 5 weight percent of a plasticizer are especially preferred. Polyhexamethylene adipamide, polycaprolactam and polyhexamethylene sebacamide are all suitable polyamides for use in such plasticized polyamide straps. The plasticizers which are useful in modifying the polyamides with respect to this invention are those plasticizers which are compatible with polyamides, and melt below 150° C. and boil above 200° C. Such suitable plasticizers include 2-ethyl hexane diol-1,3, tetramethylene sulfone, N-ethyl toluene sulfonamide-o and -p, p-toluene sulfonamide, di-n-butyl malate and n-butyl tartrate. Straps made of such plasticized polyamides can consistently be made to have tensile breaking strengths of over 70,000 p.s.i. The addition of plasticizer to the polyamides also results in improved processability of the billet into strapping. This improvement greatly reduces the number of breaks encountered when orienting the strapping. Polyethylene makes a useful strapping but it is not as strong as the preferred polymers. Polyoxymethylene as used herein is intended to include copolymers thereof containing 95% or more of oxymethylene units.

The following examples presented in Table I are illustrative of the invention.

In each of these examples the strapping was made on the apparatus above described using three-inch diameter orienting rolls. In all of the examples the die head was maintained at less than one inch from the quench bath. The quench bath was water maintained at ambient temperature of 50° C. in all cases. The tensile strength and modulus data were obtained in a conventional test machine equipped with slotted mounting rolls with a one inch per minute loading rate and a five inch separation between rolls. The test results are all based on the original dimensions of the strapping. In Table I, R.V. stands for relative viscosity which for the polyamides was obtained in accordance with A.S.T.M.–D–789, M.I. stands for melt index which was obtained in accordance with A.S.T.M.–D–1238 using a temperature of 190° C. and a load of 2160 g. on the melt indexer, F.N. stands for flow number which was obtained in accordance with A.S.T.M.–D–1238 using a temperature of 230° C. and a load of 2160 g. on the melt indexer. The polyoxymethylene used was a commercial grade resin having a number average molecular weight of 80,000. The relative viscosity of the polyethylene terephthalate was obtained at 25° C. from an 8.7 wt. percent solution in "formal." "Formal" is a solvent consisting of 7 parts 2,4,6-trichloro phenol and 10 parts phenol. The stress cycle in the case of polyethylene was taken to 20,000 p.s.i. instead of 35,000 p.s.i. as indicated in the heading for the other materials.

TABLE 1

| Ex. | Material | Billet speed, ft./min. | Melt temp., °C. | Width, in. | Thickness, mils | Deformation ratio Length | Deformation ratio Width | Melt draw | Rolling Temp., °C. | Tensile strength, p.s.i. | Elong. at break, percent | Tangent modulus, p.s.i. | Transverse strength, p.s.i. | Cycle to 35,000 p.s.i. stress Elong. at 35,000 p.s.i. | Cycle to 35,000 p.s.i. stress Elong. return to 17,500 p.s.i. | Cycle to 35,000 p.s.i. stress Elong. on return to 10 lbs. | Width of X-ray peaks at ½ max, degrees Tilt of chains Roll-direction →thickness direction | Width of X-ray peaks at ½ max, degrees Tilt of chains Roll-direction →transverse direction | Tilt of (0,10) planes about rolled surfaces |
|---|---|---|---|---|---|---|---|---|---|---|---|---|---|---|---|---|---|---|---|
| 1 | Polyhexamethylene adipamide (RV 53). | 300 | 280 | | 20 | 4.27 | 1.0 | | 185 | 65,000 | 10 | 780,000 | | 6.3 | 4.9 | 1.25 | 17.6 | 20.0 | 29.4 |
| 2 | do | 300 | 280 | | 21 | 4.15 | 1.0 | | 200 | 61,400 | 11.5 | 664,000 | | 6.8 | 5.4 | 1.5 | 18.8 | 21.2 | 31.2 |
| 3 | do | 300 | 280 | | 21 | 4.20 | 1.0 | | 150 | 67,000 | 12 | 774,000 | | 5.75 | 4.3 | 0.6 | 20.6 | 21.6 | 30.8 |
| 4 | do | 60 | 280 | | 21 | 4.26 | | | | 67,900 | 15.1 | 696,000 | | | | | | | |
| 5 | do | 300 | 280 | | 19.5 | 4.55 | | | | 70,000 | 9.5 | 873,000 | | | | | | | |
| 6 | do | 300 | 280 | | 18.5 | 4.77 | | 1 | | 70,800 | 9.6 | 962,000 | | | | | | | |
| 7 | do | 150 | 280 | | 17.5 | 4.75 | | 1 | | 57,200 | 7.0 | 973,000 | 13,200 | | | | | | |
| 8 | do | 150 | 280 | | 22 | 4.00 | | 1 | | 60,800 | 11.4 | 674,000 | | 6.8 | 5.4 | | 18.8 | 21.6 | 32.8 |
| 9 | do | 150 | 280 | | 18.5 | 4.71 | | 4 | | 74,800 | 11.0 | 909,000 | 14,000 | 5.75 | 4.3 | | 17.6 | 18.4 | 27.6 |
| 10 | do | 150 | 280 | | 21.5 | 4.04 | | 2 | | 50,200 | 13.9 | 665,000 | 12,000 | | | | | | |
| 11 | do | 150 | 280 | | 19 | 4.44 | | 2 | 25 | 67,000 | 13.4 | 755,000 | | | | | | | |
| 12 | do | 150 | 280 | | 17.5 | 4.02 | 1.22 | | 200 | 69,200 | 12.4 | 693,000 | 14,900 | | | | 18.4 | 21.6 | 30.4 |
| 13 | do | 150 | 280 | | 16.5 | 4.38 | 1.25 | | 180 | 66,100 | 12.1 | 694,000 | 14,000 | | | | | | |
| 14 | Polyeaprolactan (RV 325) | 150 | 275 | | 27 | 4.1 | 1.08 | | 180 | 46,300 | 10 | 509,000 | | | | | | | |
| 15 | Polyoxymethylene | 75 | 195 | | 36 | 3.5 | 0.92 | | 150 | 51,800 | | 264,000 | 10,900 | 7.87 | 6.60 | 2.24 | | | |
| 16 | do | 20 | 195 | | 30 | 4.5 | 0.90 | | | 61,000 | | 434,000 | 10,200 | 7.40 | 5.45 | 1.48 | | | |
| 17 | do | 80 | 195 | | 30 | 5.4 | 0.85 | | | 64,200 | | 575,000 | 11,000 | 5.93 | 4.38 | 1.48 | | | |
| 18 | do | 80 | 195 | .526 | 26 | 5.0 | 0.91 | | | 70,000 | | *431,000 | 11,900 | 6.35 | 4.65 | 1.13 | | | |
| 19 | Polyethylene (MI 2.76) | 100 | 170 | | 27 | 5.1 | 0.87 | | | 17,200 | | *348,000 | 4,330 | 11.45 | 10.23 | 4.53 | 7.8 | 13.0 | 45 |
| 20 | do | 30 | 170 | | 39 | 6.2 | 0.85 | | | 21,600 | | *518,000 | 4,780 | 10.40 | 9.50 | 3.78 | 12.0 | 9.6 | |
| 21 | do | 30 | 170 | | 34 | 9.2 | 0.76 | | | 37,300 | | *698,000 | 4,670 | 4.75 | 4.63 | 2.15 | 10.0 | 8.8 | |
| 22 | do | 30 | 170 | | 24 | 7.8 | 0.82 | | | 32,600 | | *710,000 | 4,560 | 5.30 | 4.93 | 1.88 | | | |
| 23 | Polypropylene (FN 0.3) | 100 | 200 | | 33 | 6.75 | 0.84 | | 90 | 36,600 | | 371,000 | 4,370 | 9.0 | 7.7 | 2.8 | 9.6 | 10.4 | |
| 24 | do | 100 | 200 | | 29 | 8.15 | 0.83 | | 90 | 49,000 | | 452,000 | 4,620 | 7.2 | 6.0 | 1.75 | 8.5 | 8.7 | |
| 25 | do | 100 | 200 | .515 | 22 | 10.8 | 0.74 | | 90 | 54,100 | | 860,000 | 2,760 | 3.3 | 2.6 | 0.8 | | | |
| 26 | do | 100 | 200 | .501 | 31 | 7.63 | | | 80 | 38,800 | | 351,000 | 3,920 | 6.78 | 6.78 | 2.75 | | | |
| 27 | do | 100 | 200 | .437 | 25 | 9.90 | | | 60 | 40,101 | | 630,000 | 2,120 | 8.13 | 3.80 | 3.13 | | | |
| 28 | do | 100 | 275 | | 26 | 3.92 | 0.70 | | 50 | 33,700 | | 620,000 | 6,280 | 5.00 | | | | | |
| 29 | Polyethylene terephthalate (RV30) amorphous form. | 100 | 275 | .503 | 18 | 4.23 | 0.80 | | 50 | 44,200 | | low | 7,950 | 8.80 | 8.13 | 6.00 | | Yield at 26,500 p.s.i. | |
| 30 | do | 100 | 275 | .552 | 22 | 3.57 | 0.88 | | 150 | 37,900 | | low | 7,880 | 4.65 | 3.63 | 1.20 | | | |
| 31 | Polyethylene terephthalate (RV30) crystalline form. | 100 | 275 | .573 | 19 | 4.23 | 0.92 | | 150 | 46,500 | | 899,000 | 7,790 | 2.33 | 1.55 | 0.35 | | | |
| 32 | do | 100 | 275 | .584 | 16 | 4.71 | 0.93 | | 150 | 54,800 | | 1,029,000 | 7,100 | 2.25 | 1.63 | 0.48 | | | |
| 33 | do | 100 | 275 | .590 | 15 | 5.18 | 0.94 | | 150 | 58,100 | | 1,217,000 | 6,800 | 2.63 | 2.0 | 0.90 | | | |
| 34 | do | 100 | 275 | .593 | 15 | 5.33 | 0.95 | | 150 | 51,900 | | 1,287,000 | 8,220 | 2.58 | | | | | |

*Initial Modulus, p.s.i.

TABLE I—Continued

| Ex. | Material | Billet speed, ft./min. | Melt temp., °C. | Width, in. | Thickness, mils | Deformation ratio, length | Rolling temp., °C. | Tensile strength, p.s.i. | Tangent modulus, p.s.i. | Transverse strength, p.s.i. | Elong. at 35,000 p.s.i. |
|---|---|---|---|---|---|---|---|---|---|---|---|
| 35 | Polyhexamethylene adipamide (RV 53) | 150 | 280 | .502 | 20 | 4.76 | 190 | 70,900 | 954,000 | 8,080 | 5.15 |
| 36 | ___do___ | 150 | 280 | .530 | 15 | 4.95 | 190 | 74,600 | 819,000 | 11,000 | 6.25 |
| 37 | ___do___ | 150 | 280 | .522 | 16 | 4.80 | 110 | 75,900 | 908,000 | | 6.42 |
| 38 | ___do___ | 150 | 280 | .526 | 15 | 4.96 | 150 | 79,900 | 913,000 | 10,200 | 6.03 |
| 39 | ___do___ | 150 | 280 | .530 | 19.5 | 4.40 | 170 | 70,900 | 900,000 | | 6.98 |
| 40 | ___do___ | 150 | 280 | .530 | 16 | 4.85 | 175 | 72,400 | 801,000 | | 5.90 |
| 41 | ___do___ | 150 | 280 | .522 | 16 | 5.05 | 125 | 73,700 | 937,000 | | 6.03 |
| 42 | ___do___ | 150 | 280 | .529 | 19 | 4.29 | 190 | 71,400 | | | |
| 43 | ___do___ | 150 | 280 | .530 | 17 | 4.70 | 190 | 70,400 | 781,000 | 11,400 | 6.37 |
| 44 | ___do___ | 150 | 280 | .529 | 17 | 4.65 | 190 | 75,300 | | | |
| 45 | ___do___ | 150 | 280 | .529 | 16 | 4.97 | 190 | 78,800 | 773,000 | 11,200 | 6.90 |
| 46 | ___do___ | 150 | 280 | .530 | 15 | 5.05 | 190 | 75,900 | | | |
| 47 | ___do___ | 150 | 280 | .504 | 20 | 4.56 | 175 | 76,800 | | | |
| 48 | ___do___ | 150 | 280 | .502 | 18 | 4.99 | 175 | 76,400 | | | |
| 49 | ___do___ | 150 | 280 | .503 | 18 | 5.19 | 175 | 72,700 | | | |
| 50 | ___do___ | 150 | 280 | .502 | 21 | 4.18 | 175 | 72,300 | | | |
| 51 | ___do___ | 150 | 280 | .501 | 20 | 4.37 | 175 | 78,800 | | | |
| 52 | Polycaprolactam (RV 55) | 150 | 240 | .499 | 20 | 4.50 | 125 | 71,400 | 840,000 | 9,820 | 7.75 |
| 53 | ___do___ | 150 | 240 | .499 | 20 | 4.62 | 125 | 71,700 | 848,000 | 9,900 | 7.25 |
| 54 | Polyhexamethylene adipamide (RV 53) | 15 | 280 | .497 | | 4.36 | 175 | 60,500 | 797,000 | | 6.08 |
| 55 | ___do___ | 16 | 280 | .512 | 21 | 4.23 | 175 | 60,700 | 639,000 | | 5.94 |
| 56 | Acetal copolymer | 180 | 190 | | 26 | 5.0 | | 65,000 | 410,000 | | |
| 57 | Polypivalolactone (NI3) | 100 | 255 | | 18 | 5.0 | 130 | 55,000 | 900,000 | 7,000 | |
| 58 | Polycaprolactam (RV 55) | 150 | 240 | .503 | 20 | 4.49 | 190 | 61,700 | | | |
| 59 | ___do___ | 150 | 240 | .503 | 18 | 4.85 | 190 | 63,400 | | | |
| 60 | Polycaprolactam | 150 | 240 | .5 | 20 | 4.5 | 125 | 70,500 | | | |

Figure 11:
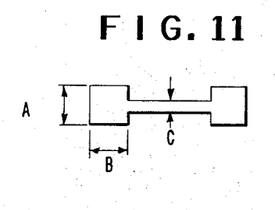
FIGURE 11 is a cross-section of the strap of Example 54.
Figure 12:
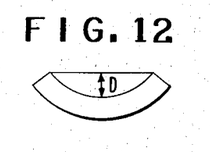
FIGURE 12 is a cross-section of the strap of Example 55.

Examples 19, 28 and 29 are to non-preferred straps. In Examples 36 to 38 the polymer contained 1 weight percent; in Example 39, 2 weight percent, in Examples 40 and 41, 5 weight percent, in Examples 42 and 43, 0.1 weight percent and in Examples 44 to 46, 0.5 weight percent of N-ethyl toluene sulfonamide (o&p) as a plasticizer. In Examples 47 to 49, 1 weight percent of 2-ethyl hexane diol-1,3 was employed as a plasticizer. In Examples 50 and 51, 1 weight percent of tetramethylene sulfone, and in Examples 14, 52 and 53 1 weight percent of ω-caprolactam. In Example 54 the strap had a dumbbell cross-section with thick edges and a thin center area as shown in FIGURE 11. The strap of Example 54 was .497 in. wide the thick edges as at A were 27 mils thick and 1/16 in. wide as at B and the center portion as at C was 19 mils thick. In Example 55, the strap had a "C" shaped cross-section as illustrated in FIGURE 12. The "C" in the strap of Example 55 had a curvature such that the low point of the convex side as at D was .035 in. below a straight line drawn between the two edges. In both Examples 54 and 55 the billet had a rectangular cross-section and the final shape of the strap was formed by using orienting rolls corresponding to the shape of the final strap. In Example 56, the acetal copolymer was "Celcon"® sold by the Celanese Corporation of America. The polycaprolactam used in Example 60 is not cross-linked and is formed by mixing 300 parts of ω-caprolactam with 4 parts of NaH to form one stream, mixing 100 parts of caprolactam with 1.2 parts of phenyl isocyanate to form a second stream and then mixing the two streams at 150° C. Polymerization occurs in one minute accompanied by an adiabatic temperature rise to 200° C. The polymer is then fed to a vacuum extruder to extract the remaining monomer and to supply melt to the billet die at 240° C.

The term "uniplanar, axial orientation" employed in defining the product of this invention may be fully understood from the following discussion.

"Axial," "planar," and "uniplanar" indicate different types of crystal orientation in high polymeric materials. "Axial" orientation means that a given crystal axis (frequently the polymer chain axis) is parallel to a macroscopic axis (e.g., the machine direction in an extruded object). For example, prior art materials which had been drawn in only one direction (e.g., fibers or one-way stretched films) generally exhibit an appreciable degree of axial orientation in which the polymer chain axes are aligned parallel to the stretched direction. "Planar" orientation means that a given crystal axis is parallel to a macroscopic level plane. Conventional two-way stretched films for example generally exhibit a degree of planar orientation in that the molecular chain axes lies approximately parallel to the surface of the film although said axes are arranged at random within this plane. Uniplanar orientation means that a given crystal axis is parallel to a macroscopic axis and a given crystal plane is parallel to a macroscopic plane. In the rolled, extruded shapes discussed here the molecular chain axis is generally in the direction of rolling and a certain crystal plane is parallel to the rolled surface. As used here the terms "axial," "planar," and "uniplanar" orientation refer not only to perfect alignment of the types discussed but also to structures in which there is a preferred orientation even though there may be some angular distributions about the preferred orientation. Roll-oriented polymers generally exhibit "uniplanar, axial orientation" but in certain cases, for example, polypropylene axial orientation may be dictated.

X-ray diffraction furnishes a convenient technique for observing the type of orientation in the objects of this invention. A sample is mounted on an instrument such as a Single Crystal Orienter which has the ability to rotate the sample in the X-ray beam about two mutually perpendicular axes. Since a crystalline material will diffract X-rays only when the X-ray beam, the detector, and suitable crystalline planes within the sample are arranged in the manner described by Bragg's law, it is possible to determine the crystal orientation within the sample by studying the variation in the intensity of the diffracted X-rays as the sample is rotated. This intensity will pass through a maximum as the angular orientation of the sample reaches a value corresponding to the most populous orientation of the crystals within the sample. The breadth of the distribution of crystal orientations may be characterized by the width of a plot of X-ray intensity vs. the angular orientation of the sample at an intensity value equal to one-half of the peak maximum. Further aspects of the definition of the types or orientation and of techniques for determining the distribution of crystal orientation in synthetic polymers are described in a paper by C. J. Heffelfinger and R. L. Burton in the Journal of Polymer Science, volume 47, pages 289–306 (1960).

In an extruded, rolled shape made from polyhexamethylene adipamide, the uniplanar axial orientation is such that the polymer chains tend to be in the direction of rolling and the (010) crystal planes tend to be parallel to the rolled surface. The angular width at the one-half maximum corresponding to the tilting of the polymer chains from the roll direction toward the thickness direction is less than 23° in the preferred structures. The tilting of the polymer chains from the roll direction toward the transverse direction is characterized by an angle of less than 23°. The tilting of the (010) planes about the roll direction away from parallellity with the roll surface is characterized by an angle of less than 35° in the preferred structures. These angles correspond to those obtained for uniplanar axial orientation in polyhexamethyleneadipamide which has been rolled to increase its length at least four-fold. The other polymers useful in this invention will have corresponding angles for the deviation of polymer chain axes from the direction of rolling equal to or less than those cited. However, the uniplanarity may be less sharply defined in other useful polymers. The half maximum tilting of the chains from the roll direction toward the thickness or the transverse direction is preferably less than 23° for all resins. The half maximum tilting of the chains from the roll direction toward the thickness direction or the transverse direction in the case of polypropylene, polyethylene and polyoxymethylene is preferably less than 15°.

It is well known in the art that controlled deformation of a crystalline polymer results in an improvement in the physical properties of the polymer in the direction of deformation. This is most highly developed in the case of fiber and filaments where very marked improvement in tensile strength and modulus with an axial orientation is obtained by cold drawing of the extruded fiber or filament. Attempts to obtain equivalent improvement in physical properties in more massive plastic shapes with triaxial symmetry such as tapes, straps, sheets, angles, tees, and the like have not been successful, although significant improvement has been obtained in many cases. Failure to obtain the enhancement in physical properties equivalent to high quality fibers can probably be traced to the failure to obtain the required perfection and type of structure in these more massive objects with triaxial symmetry. The above examples illustrate the achievement of the required perfection of structure with crystalline polymers and copolymers by careful control of the polymer and the processing at high nondestructive deformations.

These unique plastic materials are characterized by a high perfection in the structure, high tensile strength combined with high modulus, and excellent recovery from high load. These same properties are exhibited by high quality fibers which have uniaxial orientation with circular symmetry. These new materials differ in being relatively massive with multiaxial orientation.

Figure 6:
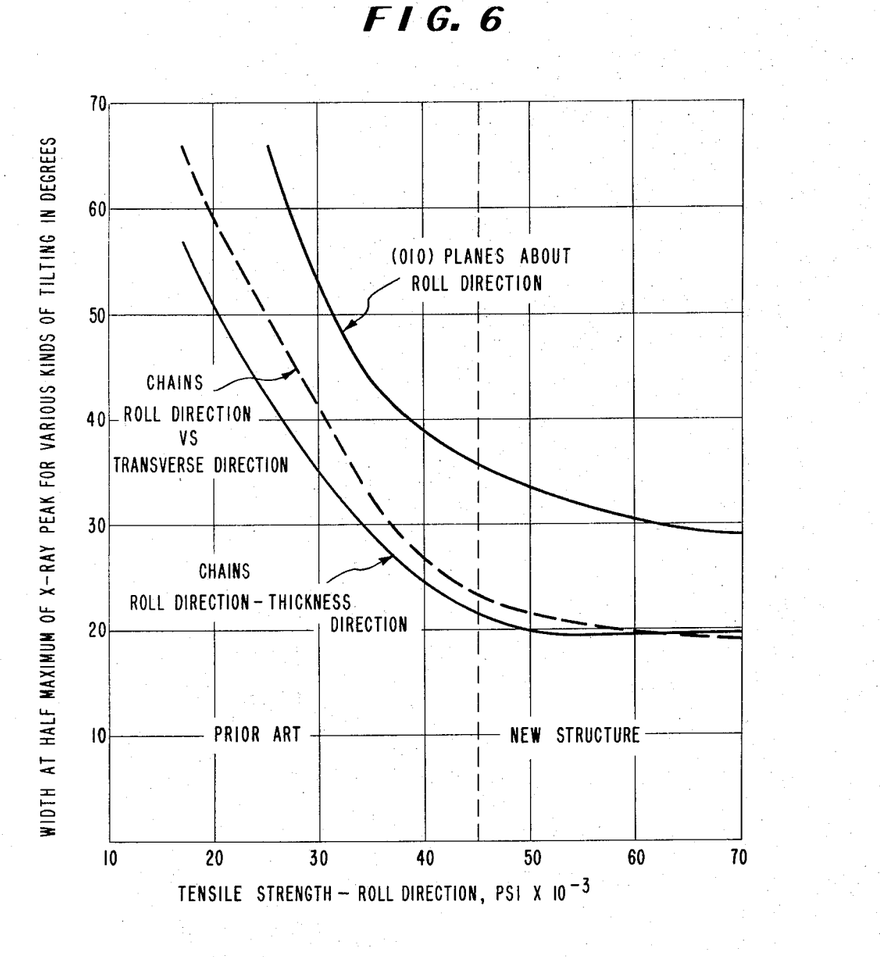
FIGURE 6 is a plot of X-ray order vs. tensile strength for oriented polyhexamethylene adipamide strapping.

This degree of perfection in the structure can be measured in several ways. One well recognized in crystallography is the measurement of the sharpness of the X-ray diffraction pattern obtained along the various axes of the object. Samples of strapping made from polyhexamethylene adipamide were prepared according to the prior art (Miles U.S. Patent 2,244,208, June 3, 1941) and according to the new techniques covered in this patent. The results of these tests are summarized in FIGURE 6. As can be seen the degree of perfection obtained for these unique materials is substantially higher than the prior art along with significant improvement in strength.

Figure 7:
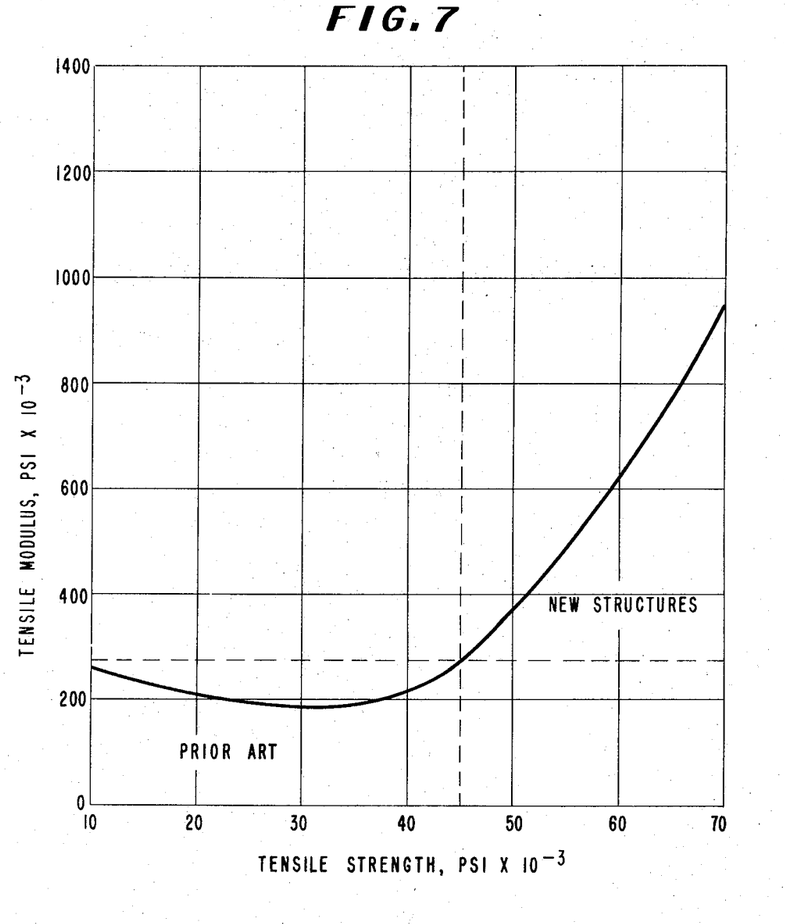
FIGURE 7 is a plot of tensile modulus vs. tensile strength for roll oriented polyhexamethylene adipamide strapping.

Although X-ray studies show the substantial differences from prior art, they are not the most sensitive and exact methods available for determining the perfection in these new materials. The most sensitive technique we have found to measure this structural difference is to plot the tensile modulus vs. the tensile strength in the main direction of orientation. This is shown in FIGURE 7, which is a plot of tensile modulus vs. strength for polyhexamethylene adipamide with a marked change in slope indicative of the onset of the unique structure with increasing strength and modulus as the structure becomes more perfect.

Figure 8:
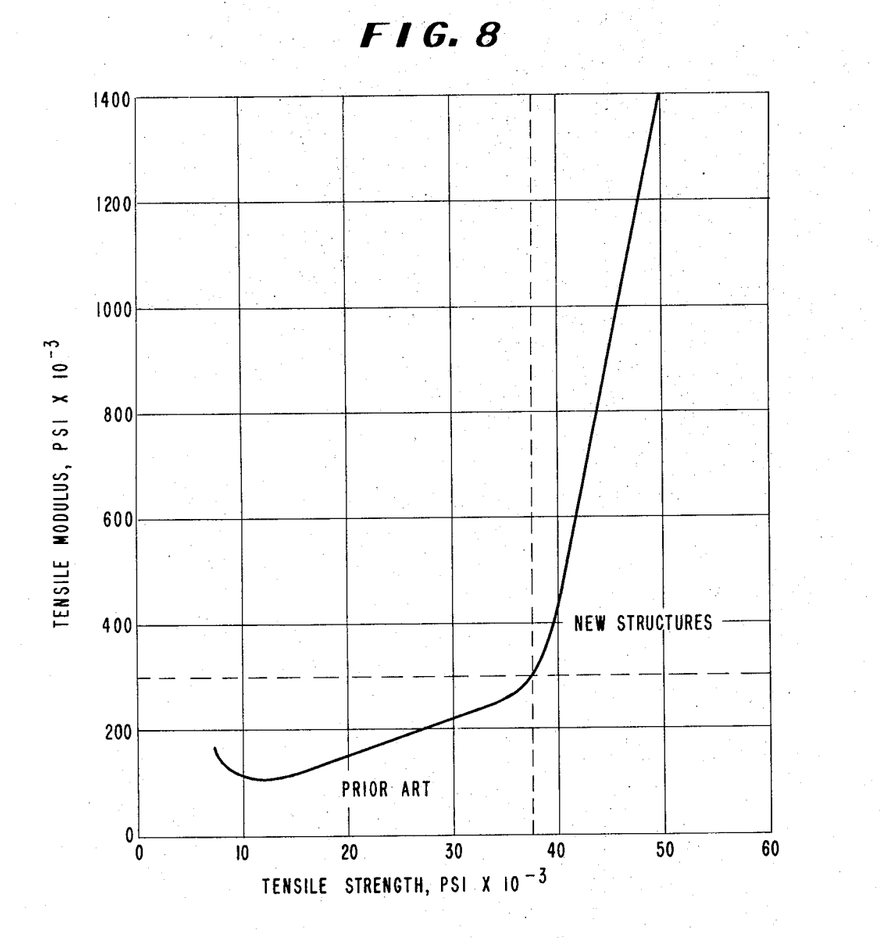
FIGURE 8 is a plot of tensile modulus vs. tensile strength for roll oriented polypropylene.

A similar plot of tensile modulus vs. strength is shown for polypropylene in FIGURE 8. The prior art examples are taken from Convention application 42,103 (July 10, 1958) of the Commonwealth of Australia "Method of Improving Mechanical Characteristics of Articles Formed From Crystallizable High Molecular Weight α-Olefin Polymers."

Figure 9:
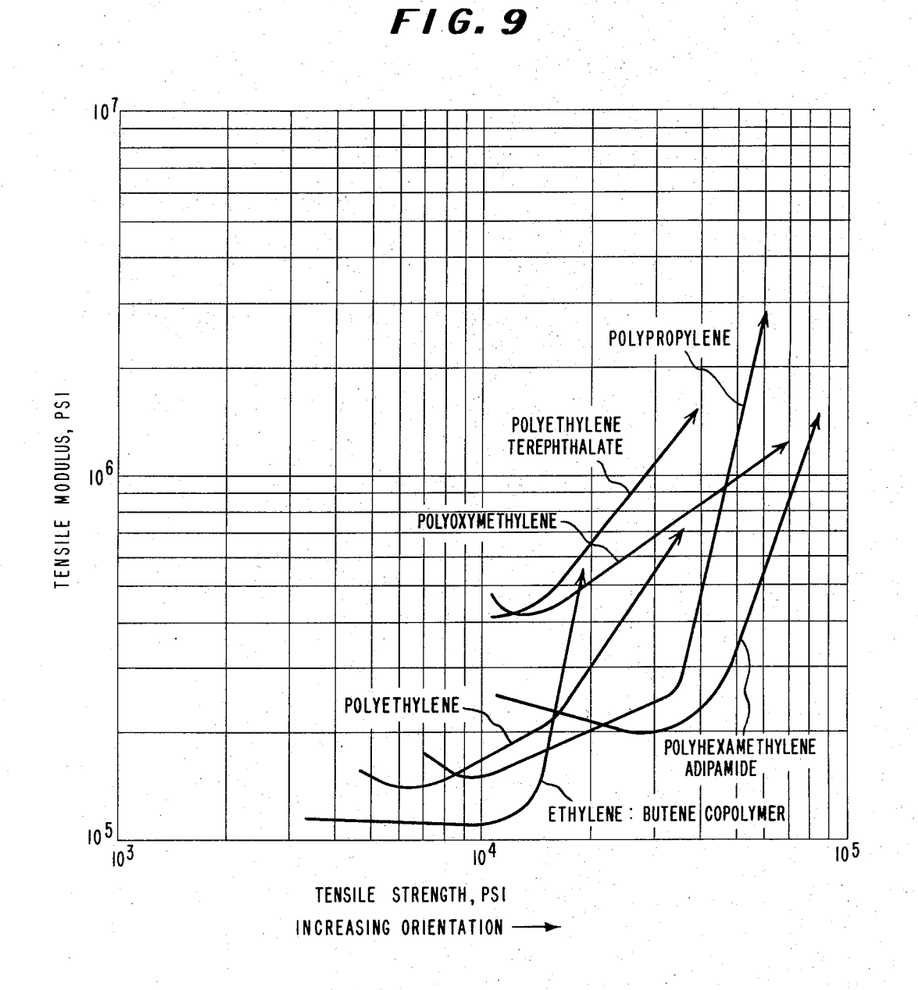
FIGURE 9 is a logarithmic plot of tensile modulus vs. tensile strength for a variety of roll oriented plastic strappings.

Similar results for both X-ray studies and property studies have been obtained by orienting other crystalline polymers under conditions to develop these unique structures. FIGURE 9 is a plot on a log-log scale of tensile modulus vs. tensile strength for a number of crystalline polymers, all of which exhibit the same marked change when processed to give the unique structures of the present invention.

Strapping must have a high tensile tangent modulus in order to be of great utility. It is the nature of crystalline polymers that when pulled or stretched that their tensile load rises sharply to a plateau upon a relatively small elongation, this plateau extends for a deformation of several "X" (times) the original dimension and then again rises sharply. It is necessary to exceed the deformation represented by the point at which this plateau ends and the tensile strength vs. deformation starts to rise sharply again in order to obtain an extremely useful strapping. If this point is not reached the strapping upon being stretched or tensioned will not return to its original longitudinal dimension but will remain permanently elongated and loose about whatever container it has been used to bind. It is preferred that a strapping upon being stretched will return to within 2% of its original longitudinal dimension. As illustrated in the examples only highly oriented strappings return to within 2% of their original dimension after receiving a substantial stress such as a 35,000 p.s.i. pull. A 20,000 p.s.i. pull was used in the examples to illustrate the recovery of polyethylene because only a few samples are illustrated with a tensile strength above 35,000 p.s.i.

A high tangent tensile modulus is an indication that the strapping has been oriented or deformed to a point where it will not permanently nor unduly stretch or deform when tensioned about a package. The minimum modulus representative of the preferred strapping of this invention is 1.75 times that of the undeformed or oriented polymer of which the strapping is fabricated. The minimum deformations to achieve this preferred 1.75× the unimproved modulus for various polymers is given in Table II.

*Table II*

| Polymer: | Minimum deformation to Achieve 1.75× unimproved tensile modulus |
|---|---|
| Polyhexamethyladipamide of Example 1 | 4.0 |
| Polyoxymethylene of Example 15 | 4.0 |
| Polypropylene of Example 23 | 8.0 |
| Polyethylene of Example 19 | 4.7 |
| Polyethylene terephthalate of Example 32 | 2.5 |

Because of the expense involved in the rolling and fabrication procedures of this invention it is necessary that a strapping have a tensile breaking strength of at least 40,000 p.s.i. in order to compete with steel strapping. Therefore, 40,000 p.s.i. represents the minimum preferred tensile break strength. While some polymers, such as polyethylene, produce strappings of slightly less than 40,000 p.s.i. their relative low cost can make such a polyethylene strapping valuable for many uses where the extreme high strength of steel strapping is not necessary. It is further pointed out that while having high longiudinal strengths the straps of this invention have a transverse strength about equal to the unoriented resin and therefore have a high resistance to being pulled apart by non-uniform fastening means.

Figure 10:
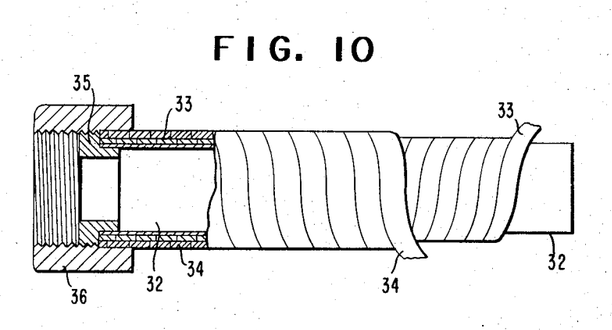
FIGURE 10 is an exploded view of a pipe made using the strapping of this invention.

The strapping of this invention is especially useful in forming light weight, high strength pipe. Such pipe is illustrated in FIGURE 10 in which a liner 32 is helically wrapped with a first layer of strapping 33, which in turn is helically wrapped in the opposite direction with another strapping 34. The pipe can be held together by adhesively bonding the two strappings and the liner together as they are assembled. It is also possible to hold the elements of the pipe together by mechanical means as illustrated in FIGURE 10 wherein the end of the pipe is clamped onto end piece 35, by means of collar 36. If an unusually long piece of pipe is required, the liner is best pieced every 10 to 30 ft. and held together with a conventional ferrule. The two straps are then wound directly over the ferrule and a conventional hose clamp applied to hold the assembly intact.

The pipe can be made without a liner by wrapping the strapping around a mandrel, adhesively or otherwise bonding the edges together and then sliding the thus formed pipe from the mandrel. Regardless of whether a liner is used or not the optimum strength is obtained when the width of the strap is related to the diameter of the pipe such that the angle of the strap when helically wound to form the pipe is 53° from the axis of the pipe. The preferred angles range from 45° to 70° from the axis of the pipe.

We claim:

1. A shaped article formed of a crystalline, synthetic, thermoplastic resin, said article being at least 10 mils thick, at least one-quarter inch wide, and of uniform cross-section, in which the resin has an axial orientation in the longitudinal direction of said article and the tensile modulus along the longitudinal axis of said article is at least 1.75 times the tensile modulus of the same resin in the unoriented condition and which article has a tensile strength in the longitudinal direction of above 40,000 p.s.i. and in which shape the half maximum tilting of the polymer chains from the longitudinal direction toward the thickness direction is less than 23 degrees.

2. The article of claim 1 wherein the resin is polyethylene.

3. The article of claim 1 wherein the tensile break strength of the article is above 40,000 p.s.i.

4. The article of claim 3 wherein the resin is a polyolefin, and in which the half maximum tilting of the polyolefin chains from the longitudinal direction toward the thickness direction is less than 15 degrees.

5. The article of claim 4 wherein the resin is polypropylene.

6. The article of claim 3 wherein the resin is a polyamide.

7. The article of claim 6 wherein the polyamide is polycaprolactam.

8. The article of claim 6 wherein the polyamide is polyhexamethylene adipamide.

9. The article of claim 6 wherein the polyamide contains from 0.2 to 5 weight percent of a plasticizer.

10. The article of claim 1 wherein the resin is a polyester.

11. The article of claim 1 wherein the resin is an acetal resin.

12. A strap formed of a crystalline synthetic thermoplastic resin, said strap being of uniform cross-sectional configuration at least one-quarter of an inch wide and 10 mils thick in which strap the resin exhibits an axial orientation and a longitudinal strength of at least 40,000 p.s.i. and a modulus of at least 1.75 times the modulus of the unoriented resin and in which strap the half maximum tilting of the polymer chains from the longitudinal direction toward the thickness direction is less than 23 degrees.

13. The strap of claim 12 wherein the resin is a polyolefin, and in which the half maximum tilting of the polyolefin chains from the longitudinal direction toward the thickness direction is less than 15 degrees.

14. The strap of claim 12 wherein the resin is a polyamide.

15. The strap of claim 14 wherein the polyamide is polycaprolactam.

16. The strap of claim 14 wherein the polyamide is polyhexamethylene adipamide.

17. The strap of claim 14 wherein the polyamide contains from 0.2 to 5 weight percent of a plasticizer.

18. The strap of claim 12 wherein the resin is a polyester.

19. The strap of claim 12 wherein the resin is an acetal resin.

References Cited

UNITED STATES PATENTS

| | | | |
|---|---|---|---|
| 2,445,726 | 7/1948 | Willert | 264—210 X |
| 2,514,195 | 7/1950 | Kuhn | 264—210 X |
| 2,723,705 | 11/1955 | Collins | 138—144 X |
| 2,984,593 | 5/1961 | Isakse et al. | 161—402 X |
| 3,066,366 | 12/1962 | Wyckoff et al. | 161—177 |
| 3,086,275 | 4/1963 | Pritchard | 161—181 X |
| 3,117,597 | 1/1964 | Fritz et al. | 138—130 X |
| 3,189,052 | 6/1965 | Devaney | 138—130 |
| 3,223,764 | 12/1965 | Kahn | 264—210 X |

FOREIGN PATENTS 833,492  10/1938  France.

LAVERNE D. GEIGER, *Primary Examiner.*

C. L. HOUCK, *Assistant Examiner.*

Disclaimer

3,354,023.—*Gordon Beale Dunnington*, Wilmington, and *Reuben Thomas Fields*, Brandywine Hills, Del. ORIENTED POLYMERS. Patent dated Nov. 21, 1967. Disclaimer filed Apr. 18, 1970, by the assignee, *E. I. du Pont de Nemours and Company*.

Hereby enters this disclaimer to claims 1, 2, 3, 4, 5, 12 and 13 of said patent.
[*Official Gazette August 18, 1970.*]